3,324,185
DERIVATIVES OF FLUORINATED KETONES AND PROCESS FOR PRODUCING SAME
Everett E. Gilbert and Morton Litt, Morris Township, Morris County, and Julian A. Otto, Stockholm, N.J., assignors to Allied Chemical Corporation, New York, N.Y., a corporation of New York
No Drawing. Filed Dec. 2, 1963, Ser. No. 327,520
7 Claims. (Cl. 260—609)

This invention relates to derivatives of fluorinated ketones useful as active pesticidal toxicants.

It is known that phenol may be reacted with hexafluoroacetone in the presence of anhydrous hydrogen fluoride. The phenol and hexafluoroacetone react only at 2:1 mol ratio in accordance with the following equation:

$$2C_6H_5OH + (F_3C)_2CO \rightarrow (HOC_6H_4)_2C(CF_3)_2 + H_2O$$

Moreover, substitution occurs only in the para-position of the phenolic ring.

One object of the present invention is to provide new derivatives of fluorinated ketones.

A further object of this invention is to provide a novel simple and economical process for the preparation of derivatives of fluorinated ketones.

Still a further object of the invention is the provision of derivatives of fluorinated ketones for use as active pesticidal toxicants.

Other objects and advantages will be apparent from the following description.

The new derivatives of fluorinated ketones may be represented by the following general formula:

$$R—C(OH)(CF_2X)(CF_2Y)$$

wherein R is a nuclearly hydroxy-substituted aryl radical which is connected to the adjacent carbon atom by an ortho-linkage and X and Y are members selected from the group consisting of fluorine and chlorine.

These ortho-derivatives, as well as para-derivatives, of fluorinated ketones may be readily prepared by reacting a nuclearly hydroxy-substituted aromatic compound having the general formula:

$$ROH$$

wherein R is an aryl radical having at least one of a free ortho- and a free para-position with a hexahaloacetone compound having the general formula:

$$(CF_2X)(CF_2Y)CO$$

wherein X and Y are members selected from the group consisting of fluorine and chlorine under non-catalytic conditions or in the presence of a sulfonic acid catalyst. The aromatic compound and hexahaloacetone compound react only at 1:1 mol ratio, as illustrated by the following equation wherein the aromatic compound is phenol and the hexahaloacetone compound is hexafluoroacetone:

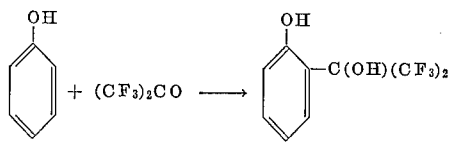

If the aromatic compound employed in the above reaction contains a free ortho-position, as in the case of phenol, substitution occurs in that position. If, however, the ortho-positions are occupied, substitution occurs in the para-position.

The hexahaloacetone compounds which may be utilized in the present invention include hexafluoroacetone, pentafluoromonochloroacetone and sym-tetrafluorodichloroacetone.

The nuclearly hydroxy-substituted aromatic compounds which are preferred in the process of this invention are compounds selected from the group consisting of phenol and alkyl-substituted, cycloalkyl-substituted, alkylmercapto-substituted and aryl-substituted phenols containing at least one of a free ortho- and a free paraposition. The alkyl groups of these compounds preferably contain from 1 to 9 carbon atoms. Typical examples of the compounds are phenol, 4-cresol, 2,6-dimethylphenol, 2,6-di-tert.-butylphenol, 3-cresol, 2-cresol, 2-tert.-butylphenol, 4-cyclohexylphenol, 2-isopropylphenol, 3-isopropylphenol, 4-isopropylphenol, 2,6-diisopropylphenol, 2-methyl-6-tert.butylphenol, 4-nonylphenol, 2-cyclohexylphenol, 2-phenylphenol, 4-phenylphenol and 4-methylmercaptophenol. Other suitable aromatic compounds include 2-chlorophenol, 4-chlorophenol, 1-naphthol, resorcinol, 1,5-naphthalenediol and Bisphenol-A (p,p'-isopropylidenediphenol).

The reactants are generally employed in mol ratio of about 0.75–1.5 mols of aromatic compound per mol of ketone, preferably about 1.0–1.2 mols of aromatic compound per mol of ketone. If the reaction is carried out employing lower or higher mol ratios, significant contamination of the desired product may occur.

The reaction may be carried out in the absence of a catalyst or preferably in the presence of a sulfonic acid catalyst. Use of a sulfonic acid catalyst enables the reaction to proceed at a considerably faster rate.

The sulfonic acid catalyst may be employed in three forms: (1) as an alkyl or aryl sulfonic acid per se, (2) as a sulfonic acid formed by adding sulfuric acid to the nuclearly hydroxy-susbtituted aromatic compound, and (3) as a sulfonic acid form ion-exchange resin such as "Dowex 50" (a sulfonated styrene-divinyl benzene copolymer having a total exchange capacity ranging from 0.3 to 2.3). Illustrative examples of alkyl sulfonic acids include methanesulfonic acid, ethanesulfonic acid, propanesulfonic acid, methanedisulfonic acid, methanetrisulfonic acid and sulfochloroacetic acid. Aryl sulfonic acids are illustrated by benzenesulfonic acid, toluenesulfonic acid, xylenesulfonic acid, chlorobenzenesulfonic acid, naphthalenesulfonic acids, dodecylbenzenesulfonic acid and petroleum sulfonic acids.

The catalyst is employed in amount ranging from about 0.1 to 10% by weight based on the amount of aromatic compound charged. For economical operation and minimum waste the sulfonic acid catalyst is employed in amount of about 2 to 5% by weight based on the aromatic compound charged.

The reaction temperature may vary between about 0° and 350° C., and is preferably about 50° to about 150° C. Of course, if super-atmospheric or sub-atmospheric pressures are employed, higher and lower temperatures may be used.

In preferred operation, a solvent is employed which is inert under the conditions of reaction and is a solvent for the reactants. Suitable solvents include benzene and its alkylated and halogenated derivatives such as xylene and chlorobenzene. The amount of solvent is not critical and may vary in amount from about 0.5 to 10 parts, and preferably about 1 to 5 parts, per part of aromatic compound charged.

Recovery of the derivatives of fluorinated ketones from the reaction mixture may be accomplished by conventional means. For example, the solvent may be readily removed by distillation to leave product as residue or the product may be precipitated by cooling and filtered off.

The derivatives of fluorinated ketones have been found to possess outstanding pesticidal, including herbicidal and/or insecticidal and miticidal, activity.

The present invention is further illustrated by the examples set forth below, in which parts are by weight.

Example 1

27 parts of 4-cresol and 100 parts of xylene were placed in a reaction vessel equipped with a mechanical stirrer, heater and Dry Ice-acetone reflux condenser. The vessel was swept with dry nitrogen to remove any possible moisture and was then heated to 100° C. (±10).

Examples 3 to 5

Various phenolic compounds were reacted with hexafluoroacetone using the procedure described in Example 2. The results of these examples, as well as additional data on Examples 1 and 2, are given in Table I set forth below.

TABLE I

| Ex. | Phenolic Compound | Reac. Time, Hrs. | Product | Analysis of Product | | | | | | Melting Point, ° C. | Yield, Percent |
|---|---|---|---|---|---|---|---|---|---|---|---|
| | | | | Carbon | | Hydrogen | | Fluorine | | | |
| | | | | Calc. | Found | Calc. | Found | Calc. | Found | | |
| 1 | 4-cresol | 14 | 2-(1,1,1,3,3,3-hexafluoro-2-hydroxyisopropyl)-4-methylphenol. | | | | | | | 121-6 | 30 |
| 2 | do | 7½ | 2-(1,1,1,3,3,3-hexafluoro-2-hydroxyisopropyl)-4-methylphenol.[1] | 43.7 | 43.1 | 2.9 | 3.3 | 41.5 | 42.0 | 121-6 | 35 |
| 3 | Phenol | 32 | 2-(1,1,1,3,3,3-hexafluoro-2-hydroxyisopropyl) phenol.[2] | 41.5 | 41.5 | 2.3 | 2.3 | 43.8 | 44.0 | 72-5 | 35 |
| 4 | 2,6-dimethylphenol. | 28 | 4-(1,1,1,3,3,3-hexafluoro-2-hydroxyisopropyl)-2,6-dimethylphenol. | 45.8 | 44.8 | 3.5 | 3.6 | 39.5 | 38.0 | 93-194 | 85 |
| 5 | 2-tert.-butylphenol. | 10 | 6-(1,1,1,3,3,3-hexafluoro-2-hydroxyisopropyl)-2-tert.-butylphenol. | 49.3 | 49.2 | 4.4 | 4.9 | 36.0 | 35.5 | 63-71 | 52 |

[1] The product was proved to be the 2-derivative by its hydrolysis to cresotic acid.
[2] The product was proved to be the 2-derivative by its hydrolysis to salicylic acid.

Hexafluoroacetone was slowly admitted to the vessel until refluxing of it from the condenser caused the reaction temperature to drop. More hexafluoroacetone was added when the original temperature was again attained. 40 parts of hexafluoroacetone were added over a period of 40 hours. Heating was continued for 3 hours at 100° C. The reaction mixture was then washed with water, and the xylene was removed by distillation. The residue, upon recrystallization from hexane, melted at 121–126° C. and comprised 20.5 parts of 2-(1,1,1,3,3,3-hexafluoro-2-hydroxyisopropyl)-4-methylphenol.

Example 2

The process of Example 1 was repeated except that 2 parts of 4-toluenesulfonic acid were added. After a reaction period of 7½ hours, 23.5 parts of product was obtained. Infrared spectral comparison and mixed melting point showed it was identical with the product of Example 1.

Example 6

94 parts of phenol and 5 parts of 4-toluenesulfonic acid catalyst were heated in a reaction vessel equipped with a mechanical stirrer, heater and reflux condenser. Sym-tetrafluorodichloroacetone was added slowly so that the reaction mixture was maintained at 110–130° C. 200 parts of the ketone were added over a 33-hour period. The resulting reaction mixture was poured into a container where it began to solidify upon cooling. It was taken up in 596 parts of chloroform, and an equal volume of hexane was then added to precipitate product. The precipitate was filtered off and dried to give 200 parts of 2 - (1,3 - dichloro - 1,1,3,3 - tetrafluoro - 2 - hydroxyisopropyl)phenol.

Examples 7 to 15

Various nuclearly hydroxy-substituted aromatic compounds were reacted with sym-tetrafluorodichloroacetone employing procedures similar to that described in Example 6. The results of these examples, as well as additional data on Example 6, are set forth in Table II below.

TABLE II

| Ex. | Phenolic Compound | Reac. Time, Hrs. | Product | Analysis of Product | | | | | | Melting Point, ° C. | Yield, Percent |
|---|---|---|---|---|---|---|---|---|---|---|---|
| | | | | Carbon | | Hydrogen | | Chlorine | | | |
| | | | | Calc. | Found | Calc. | Found | Calc. | Found | | |
| 6 | Phenol | 33 | 2-(1,3-dichloro-1,1,3,3-tetrafluoro-2-hydroxyisopropyl) phenol.[1] | 36.8 | 36.8 | 2.1 | 2.2 | 24.2 | 24.0 | 128-33 | 68 |
| 7 | 2-cresol | 10 | 6-(1,3-dichloro-1,1,3,3-tetrafluoro-2-hydroxyisopropyl)-2-methylphenol. | 39.0 | 39.0 | 2.6 | 2.9 | 23.1 | 22.8 | 128-30 | 58 |
| 8 | 2,6-dimethylphenol. | 60 | 4-(1,3-dichloro-1,1,3,3-tetrafluoro-2-hydroxyisopropyl)-2,6-dimethylphenol. | | | | | 22.1 | 22.7 | 95 | 38 |
| 9 | 4-cyclohexylphenol. | 5 | 2-(1,3-dichloro-1,1,3,3-tetrafluoro-2-hydroxyisopropyl)-4-cyclohexylphenol. | | | | | 18.9 | 18.4 | 202 | 70 |
| 10 | 3-isopropylphenol. | 5 | 2-(1,3-dichloro-1,1,3,3-tetrafluoro-2-hydroxyisopropyl)-3-isopropylphenol. | | | | | 21.2 | 20.6 | 55-63 | 66 |
| 11 | 2,6-diisopropylphenol. | 40 | 4-(1,3-dichloro-1,1,3,3-tetrafluoro-2-hydroxyisopropyl)-2,6-dimethylphenol. | 47.7 | 48.2 | 5.0 | 4.5 | 18.8 | 18.5 | 125 | 88 |
| 12 | 2-tert.-butylphenol. | 6 | 6-(1,3-dichloro-1,1,3,3-tetrafluoro-2-hydroxyisopropyl)-2-tert.-butylphenol. | | | | | 20.3 | 19.9 | 144-9 | 36 |
| 13 | 2-methyl-6-tert.-butylphenol. | 7 | 4-(1,3-dichloro-1,1,3,3-tetrafluoro-2-hydroxyisopropyl)-2-methyl-6-tert.-butylphenol. | 46.3 | 47.0 | 4.4 | 4.2 | 19.5 | 19.1 | 135-43 | 79 |
| 14 | 1-naphthol | 3 | 2-(1,3-dichloro-1,1,3,3-tetrafluoro-2-hydroxyisopropyl)-1-naphthol. | | | | | 20.6 | 19.6 | 90-4 | 51 |
| 15 | 1,5-naphthalenediol. | 22 | 2-(1,3-dichloro-1,1,3,3-tetrafluoro-2-hydroxyisopropyl)-1,5-naphthalenediol. | | | | | 25.4 | 24.6 | 276 | 88 |

[1] The product was proved to be the 2-derivative by its hydrolysis to salicylic acid.

Other representative examples are given below.

Example 16

72 parts of 1-naphthol, 100 parts of toluene and 2 parts of methanesulfonic acid were placed in a reaction vessel equipped with a mechanical stirrer, heater and Dry Ice-acetone reflux condenser, and the mixture was heated at 100°C. (±10). 80 parts of hexafluoroacetone were slowly introduced over a 3-hour period. The reaction mixture was heated for one hour at reflux. The mixture was then cooled in Dry Ice, and solid was filtered off and washed with cold toluene and hexane. After recrystallization, 92 parts (59% yield) of 2-(1,1,1,3,3,3-hexafluoro-2-hydroxyisopropyl)-1 naphthol were obtained.

Fluorine analysis of the product gave 34.9% (theory, 33.6%).

Example 17

64.5 parts of 4-chlorophenol, 86 parts of xylene and 4 parts of 4-toluenesulfonic acid were placed in a reaction vessel equipped with a mechanical stirrer and heater, and the mixture was heated to 135° C. 100 parts of sym-tetrafluorodichloroacetone were added gradually, with a total addition and heating period of 150 hours. The reaction mixture was cooled and washed with water, and the solvent was removed by distillation. Several recrystallizations from chloroform-hexane and finally from hexane gave 2 - (1,3-dichloro-1,1,3,3-tetrafluoro-2-hydroxyisopropyl)-4-chlorophenol having a melting point of 120–125° C.

The product analyzed as follows:

|  | Fluorine | Chlorine |
| --- | --- | --- |
| Calculated, percent | 23.2 | 32.5 |
| Found, percent | 23.5 | 32.5 |

Example 18

27 parts of 3-cresol, 100 parts of xylene and 1 part of concentrated sulfuric acid are placed in a reaction vessel equipped with a mechanical stirrer, heater and Dry Ice-acetone reflux condenser, and the mixture is heated at 100° C. (±10). Hexafluoroacetone is slowly admitted until refluxing of it from the condenser causes the temperature to drop. More hexafluoroacetone is added when the original temperature is again attained. 40 parts of hexafluoroacetone are added over a period of 40 hours. Heating is continued for 3 hours at 100° C. Then the reaction mixture is water-washed and the xylene solvent is removed by distillation. 2-(1,1,1,3,3,3-hexafluoro-2-hydroxyisopropyl)-3-methylphenol having a melting point of 81–85° C. is obtained in good yield.

Example 19

Example 18 is repeated except that pentatfluoromonochloroacetone is used instead of hexafluoroacetone and 1-butanesulfonic acid (5 parts) is employed as catalyst. A good yield of 2-(1,1,1,3,3-pentafluoro-3-chloro-2-hydroxyisopropyl)-3-methylphenol is obtained.

Example 20

Example 18 is repeated except that 25 parts of "Dowex 50" (acid form) is used as catalyst. A good yield of product is obtained.

Products were also produced employing procedures similar to that described in Example 6 by reacting (1) resorcinol, 1,5-naphthalenediol and p,p'-isopropylidenediphenol with hexafluoroacetone and (2) catechol, resorcinol, 2-phenylphenol, 4-phenylphenol, 4-methylmercaptophenol, 4-nonylphenol, p,p'-isopropylidenediphenol and 2-chlorophenol with sym-tetrafluorodichloroacetone using p-toluenesulfonic acid catalyst.

Infrared spectra for all of the above products showed the presence of fluorine, hydroxy groups and aromatic ring structure.

As indicated above, the compounds of this invention may be employed as active pesticidal toxicants, and particularly as insecticides, miticides and herbicides. The compounds can be employed either as the sole toxicant ingredients, or they can be employed in conjunction with other pesticidally active materials, such as DDT, benzene hexachloride, etc.

The compounds are ordinarily applied as toxicants for combating insects and mites in conjunction with a carrier which may be an inert solid, liquid or gaseous material, or a bait.

When employed in the form of a powder, fine or granular dust for killing insects and mites, the toxicant may be mixed with a substantial proportion of any suitable inert material or diluent, such as known grades of prepared parasiticide carrier clays, pyrophyllite, fuller's earth, bentonite, sulfur, lime, talc, whiting, diatomaceous earth, etc. Suitable dusts of this type usually contain not less than 0.5%, and preferably not less than 1% of toxicant.

Liquid insecticide or miticide sprays containing the toxicant may be prepared by first forming a solution of the compound in a suitable organic solvent, e.g. xylene, toluene, or benzene, and preferably adding a small amount of emulsifying agent commonly employed in the art such as diglycol oleate or p-isooctyl phenyl ether of polyethylene glycol. The resulting concentrate solution is incorporated with water in amount sufficient to form an aqueous spray dispersion or emulsion having the desired active ingredient concentration.

In a preferred embodiment, aqueous spray dispersions or suspensions may be formed by incorporating in water so-called dry wettable spray powders or water-dispersible pastes containing the compounds of the invention. These mixtures may also include inert diluents, suitable quantities of wetting, dispersing and suspending agents and, if desired, secondary toxicants.

The aqueous spray dispersions of the invention preferably should contain the toxicant in an amount not less than 1/8 pound per hundred gallon of spray, the more usual amount being in the range of 1/2 to 2 pounds per hundred gallons of spray.

The following table shows the results of test on application of typical compounds of this invention to insects and mites. The tests were carried out using 8 pounds or 1/2 pound of a 25% wettable powder composition per hundred gallons of water. The wettable powder compositions comprised 25% toxicant, 73.5% "Attaclay" (attapulgite clay carrier), 0.75% "Nacconol SW" (sodium alkyl aryl sulfonate wetting agent), and 0.75% "Elvanol 5105" (polyvinyl alcohol dispersing agent).

TABLE

| Ketone Reactant | Aromatic Compound Reactant | Formulation | Two-Spotted Mites, Percent Kill | Pea Aphids, Percent Kill | Mexican Bean Beetle Larvae, Percent Kill | Southern Armyworm Larvae, Percent Kill |
| --- | --- | --- | --- | --- | --- | --- |
| Sym-tetrafluorodichloroacetone | 1-naphthol | (1) | 98 | 100 | | |
| Do | 2-phenylphenol | (1) | 100 | 100 | | 100 |
| Do | 4-methylmercaptophenol | (1) | 100 | | 100 | 100 |
| Do | 3-isopropylphenol | (2) | 70 | | | |
| Do | Resorcinol | (2) | | | | 100 |

[1] 8 lbs. of 25% wettable powder composition per hundred gallons of water.
[2] 1/2 lb. of 25% wettable powder composition per hundred gallons of water.

The tests on toxicity to mites were carried out on two-spotted mites (*Tetranychus telarius*) by spraying the indicated formulation onto horticultural (cranberry) bean plants infested with the mites. Following treatment, the plants were stored on racks in irrigated trays under greenhouse conditions. Mortality counts were made three days after treatment.

The tests on toxicity to pea aphids (*Macrosiphum pisi*) were run by removing the pea aphids from infested broad bean plants, placing them on a wire screen and spraying them with the indicated formulation. Following treatment, the pea aphids were confined to untreated broad bean plants. Record of kill was made three days after treatment.

The tests on toxicity to Mexican bean beetle larvae (*Epilachna varivestis*) and to southern armyworm larvae (*Prodenis eridania*) were run by spraying horticultural (cranberry) bean plants with the indicated formulation and allowing the plants to dry. The larvae were confined to the treated foliage by means of wire cages. Record of kill was made three days after treatment.

The compounds of this invention are also useful as herbicidal toxicants, particularly in the post-emergent treatment of soil containing noxious broadleaf and grassy weeds.

The toxicants are preferably incorporated in liquid or solid diluents. Compositions similar to the insecticidal and miticidal compositions described above may be employed for herbicidal purposes.

The toxicants are applied to the area to be treated in amount (pounds per acre) sufficient to afford the desired control of vegetation. The optimum intensity of application will depend on such factors as amount of vegetation in the area, degree of permanency of plant eradication desired, type of plants growing in the area and climatic conditions. Hence, as is well known to those skilled in the art, the rate of application actually used will depend largely on prevailing local conditions. In most instances, effective control of germinating weed seeds and small weed seedlings may be realized by applying the toxicant at an overall rate greater than about 2 pounds per acre. Where prolonged control of established vegetation is desired, dosages greater than about 16 pounds per acre are employed.

The following example is illustrative of the post-emergent herbicidal activity of the compounds of the present invention. A test plot was covered with rape and ryegrass plants. Each compound was applied by spraying to a designated section of the test plot at the rate of 16 pounds in 40 gallons of acetone per acre, as described by Shaw and Swanson in "Weeds," vol. 1, No. 4, pp. 352–365 (July 1952). The following results were obtained several days after treatment:

Since various modifications may be made without departing from the spirit thereof, the invention is to be taken as limited only by the scope of the appended claims.

We claim:

1. A compound of the formula $$R—C(OH)(CF_2X)(CF_2Y)$$

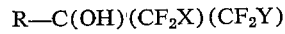

wherein R is a phenolic radical selected from the group consisting of alkylmercaptophenol in which said alkyl group contains 1 to 9 carbon atoms and alkylenediphenol, said phenolic radical being connected to the adjacent carbon atom at a position ortho to a phenolic hydroxy group, and X and Y are members selected from the group consisting of fluorine and chlorine.

2. A compound as claimed in claim 1 wherein R is a radical of the formula

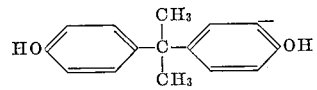

3. A compound as claimed in claim 1 wherein R is a radical of the formula

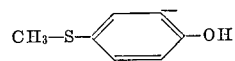

4. A process for preparing compounds of the formula $$R—C(OH)(CF_2X)(CF_2Y)$$

wherein R is a nuclearly hydroxy-substituted aryl radical which is connected to the adjacent carbon atom by an ortho- or para-linkage, said aryl radical being selected from the group consisting of hydrocarbon aryl and nuclearly substituted derivatives thereof in which said substituents are selected from the group consisting of alkyl, cycloalkyl, alkylmercapto, phenyl and alkylene-phenol, any alkyl groups present in said radicals containing 1 to 9 carbon atoms, said process comprising reacting in the presence of a sulfonic acid catalyst an aromatic compound of the formula $$HR$$

wherein R is a nuclearly hydroxy-substituted aryl radical which is selected from the group defined above and has at least one free position which is ortho or para to the hydroxy substituent, with a hexahaloacetone compound of the formula $$(CF_2X)(CF_2Y)CO$$

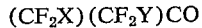

wherein X and Y are fluorine or chlorine.

5. The process of claim 4 wherein the sulfonic acid catalyst is a member selected from the group consisting of (1) alkyl sulfonic acids, (2) aryl sulfonic acids, (3) sulfonic acids formed by adding sulfuric acid to the

TABLE

| Ketone Reactant | Aromatic Compound Reactant | Injury Rating [1] | |
|---|---|---|---|
| | | Rape | Ryegrass |
| Sym-tetrafluorodichloroacetone | Phenol | 10 | 9 |
| Do | 3-cresol | 10 | 7 |
| Do | 2-cresol | 10 | 7 |
| Do | 4-cresol | 10 | 6 |
| Do | 2,6-dimethylphenol | 9 | 0 |
| Do | 3-isopropylphenol | 10 | 4 |
| Do | 1-naphthol | 10 | 1 |
| Do | 2-phenylphenol | 9 | 0 |
| Do | 4-phenylphenol | 8 | 0 |
| Do | p,p'-isopropylidenediphenol | 10 | 2 |
| Do | 4-methylmercaptophenol | 10 | 2 |
| Do | Nonylphenol | 9 | 2 |
| Do | 2-methyl-6-tert.-butylphenol | 9 | 1 |
| Do | 4-isopropylphenol | 9 | 4 |
| Hexafluoroacetone | Phenol | 10 | 8 |
| Do | 4-cresol | 9 | 3 |
| Do | 2,6-dimethylphenol | 8 | 1 |
| Do | 3-cresol | 10 | 7 |
| Untreated check | | 0 | 0 |

[1] Injury Rating—0=none; 1–3=slight; 4–6=moderate; 7–9=severe; 10=killed.

nuclearly hydroxy-substituted aromatic compound, and (4) sulfonic acid form ion-exchange resins.

6. The process of claim 4 wherein X and Y are fluorine.
7. The process of claim 4 wherein X and Y are chlorine.

References Cited

UNITED STATES PATENTS

| | | | |
|---|---|---|---|
| 1,932,886 | 10/1933 | Dunning | 167—70 |
| 2,833,830 | 5/1958 | Rigterink | 260—632 |
| 2,901,515 | 8/1959 | Rigterink | 260—632 |
| 2,998,348 | 8/1961 | Seydel et al. | 167—31 |
| 3,108,927 | 10/1963 | Pyne | 167—31 |
| 3,236,894 | 2/1966 | England | 260—574 |

FOREIGN PATENTS 1,325,204  4/1963  France.

CHARLES B. PARKER, *Primary Examiner.*
JULIAN L. LEVITT, *Examiner.*
DELBERT R. PHILLIPS, RICHARD HUFF,
*Assistant Examiners.*